Figure 1:
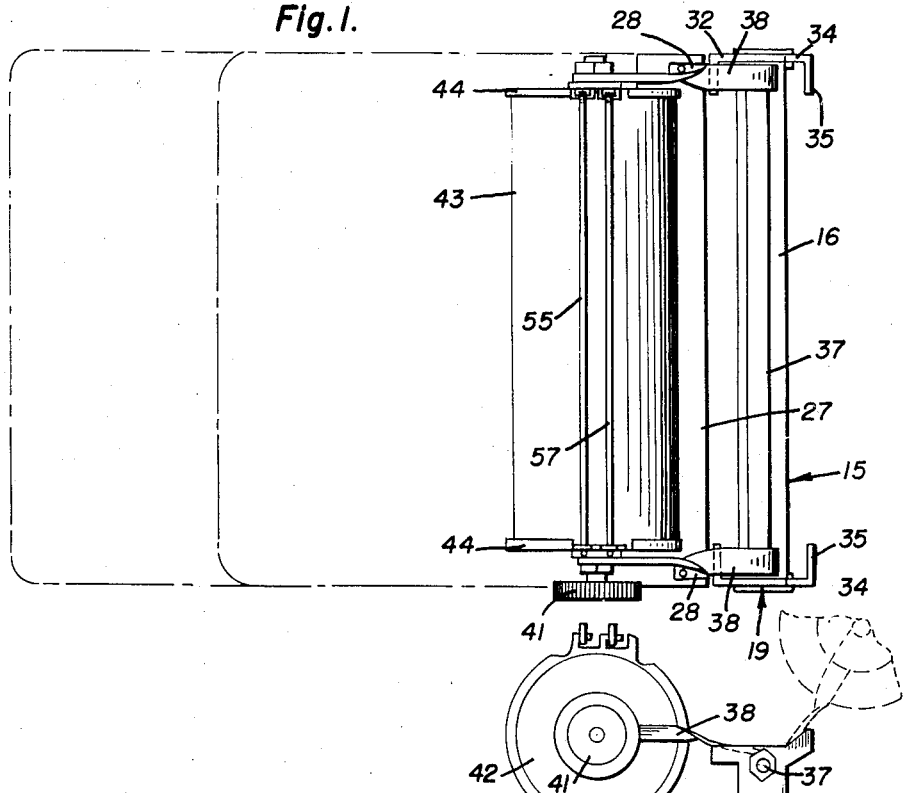

July 19, 1949.　　　　　J. SINDELAR　　　　2,476,775
COPY HOLDER

Filed Dec. 10, 1946　　　　　　　　　　3 Sheets-Sheet 1

Inventor
Joseph Sindelar

By Clarence A. O'Brien
and Harvey B. Jacobson
Attorneys

July 19, 1949.

J. SINDELAR 2,476,775

COPY HOLDER

Filed Dec. 10, 1946

3 Sheets-Sheet 2

Inventor

Joseph Sindelar

By *Clarence A. O'Brien and Harvey B. Jacobson*
Attorneys

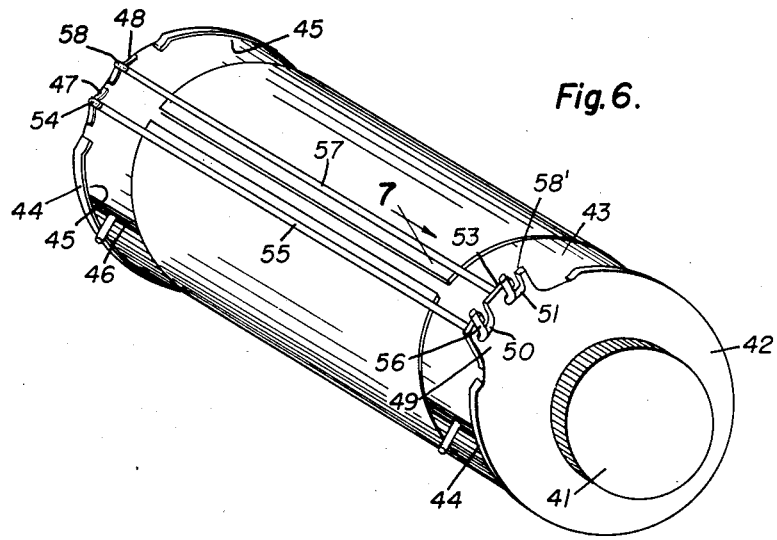
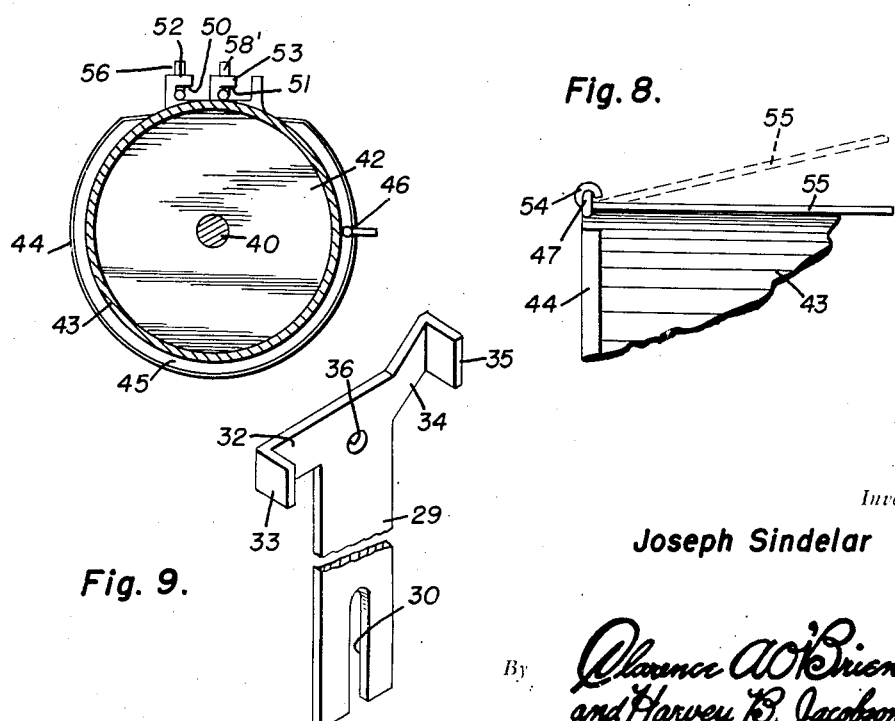
Inventor
Joseph Sindelar

Patented July 19, 1949

2,476,775

UNITED STATES PATENT OFFICE 2,476,775

COPYHOLDER

Joseph Sindelar, Dover, Idaho

Application December 10, 1946, Serial No. 715,253

1 Claim. (Cl. 120—31)

This invention relates to a copy holder and has for its primary object to support material to be copied in the line of vision of the operator of a typewriter.

Another object is to support either long or short copy pages so that several lines of the matter to be copied will be visible to the operator of the typewriter.

A still further object of the invention is to support the copy clear of the typewriter when it is desired to insert new pages in the typewriting machine.

The above and other objects may be attained by employing this invention which embodies among its features a pair of spaced parallel standards, a forwardly extending stop and a rearwardly extending stop at the upper end of each standard, an arm pivoted adjacent the upper end of each standard and adapted to be moved between the stops, a roller rotatably mounted in the arms and said roller being adapted to be held by the forward stops in a position above and slightly to the rear of the typewriter platen.

Other features include means to adjust the height of the arms so as to establish a proper relationship with the platen of a typewriter, a foot carried by the frame adjacent its lower end for engagement beneath the frame of the typewriter, a copy clamping bar detachably connected to the cylinder in a fixed position with relation to the circumference thereof, and a second copy clamping bar carried by the cylinder and adjustable circumferentially thereabout.

Figure 2:
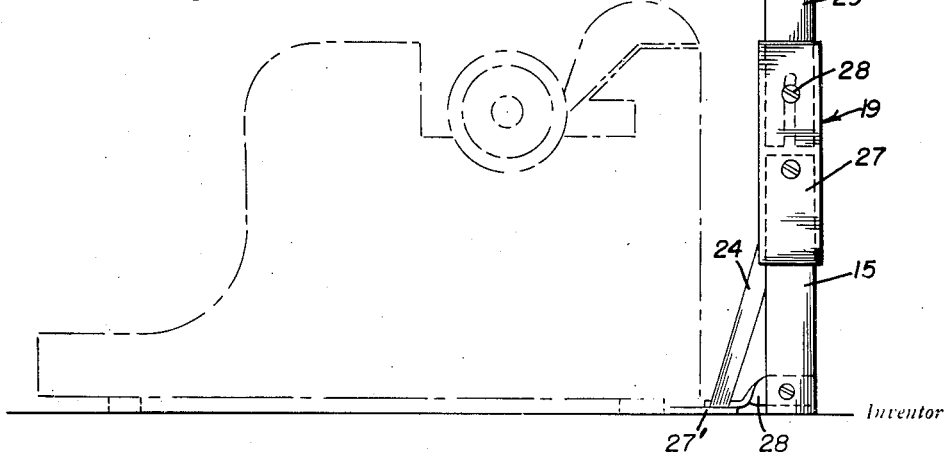
Figure 3:
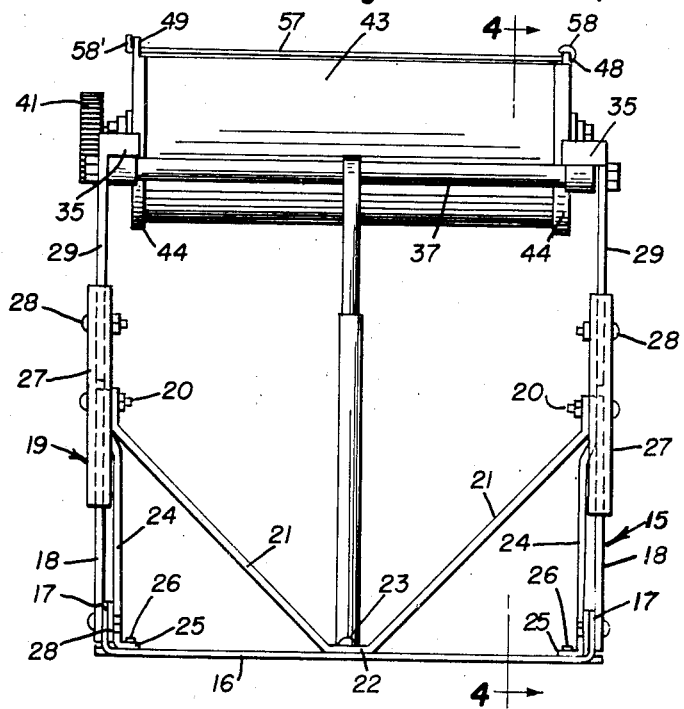
Figure 4:
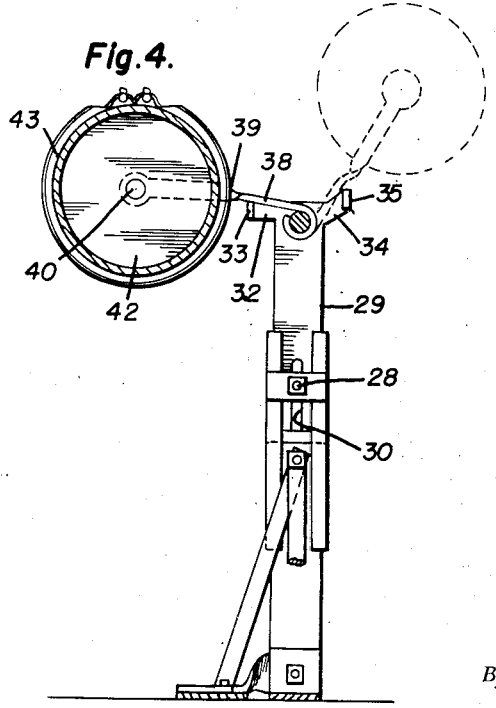
Figure 5:
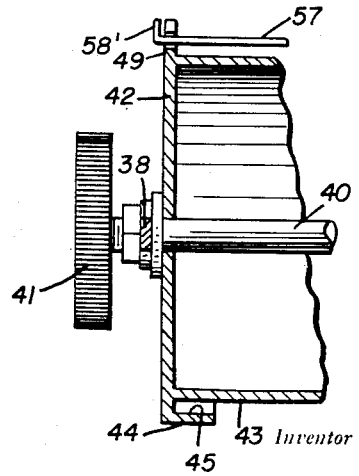

In the drawings,

Figure 1 is a plan view of a copy holder embodying the features of this invention, Figure 2 is an end view thereof illustrating in broken lines a typewriter as it would appear relative to the copy holder, Figure 3 is a rear view of the copy holder, Figure 4 is a sectional view taken substantially along the line 4—4 of Figure 3, Figure 5 is an enlarged fragmentary sectional view through the copy supporting roller, Figure 6 is a perspective view of the copy supporting roller, Figure 7 is a sectional view taken substantially along the line 7—7 of Figure 6, Figure 8 is a fragmentary side view of the copy holding cylinder, and Figure 9 is a perspective view of the upper section of one of the standards.

Referring to the drawings in detail this improved copy holder comprises a main frame designated generally 15 which includes a base bar 16 opposite ends of which are bent upwardly to form upstanding ears 17 to which are fixed upwardly extending legs 18 forming the lower portions of standards designated generally 19. The upper ends of the legs 18 are pierced to receive connecting bolts 20 to which are connected the upper ends of the legs of a V-shaped bar 21 the bight portion 22 of which is riveted or otherwise attached as at 23 to the base bar 16 substantially midway between opposite ends.

Also attached to the upwardly extending members 18 by means of the bolts 20 are the upper ends of forwardly and downwardly inclined bracket arms 24, the lower ends of which are bent angularly to form ears 25 which are riveted or otherwise attached as at 26 to a foot plate 27', the underface of which lies in a plane coincident with the underside of the bar 16 previously referred to. Arms 28 extend forwardly from the bars 18 near their lower ends and are twisted intermediate their ends so as to present a flat surface both to the foot plate 27' and the arm 18 on its respective side of the machine.

Carried on the upper end of each arm 15 is a socket 27 into which the upper portion of each standard 19 is fitted as will be readily understood upon reference to the drawings. And formed in each socket 27 intermediate its ends is an opening for the reception of an adjusting screw 28 the purpose of which will more fully hereinafter appear. Fitted in the upper end of each socket 27 is the shank 29 of the upper end of its respective standard 19, and the lower end of each shank 29 is provided with an elongated slot 30 which opens through the bottom end of the shank and straddles the bolt 28 so that by tightening the bolt the shank may be held in proper adjusted position in the socket 27. Extending forwardly from the upper end of each shank 29 is an arm 32 the extreme outer end of which is bent angularly as at 33 (Figure 9) to form a stop, the purpose of which will more fully hereinafter appear. Extending from the edge of shank 29 opposite that carrying the arm 32 is an upwardly and outwardly inclined arm 34 the free end of which is bent to form a stop ear 35, and formed in the shank midway between the arms 32 and 34 and adjacent its upper end is an opening 36. A cross bar 37 extends between the upper ends of the shanks 29 and through the openings 36 in order to hold the parts in proper spaced relation at their upper ends.

Pivotally mounted on the cross bar 37 adjacent each shank 29 is an arm 38 which is twisted intermediate its ends as at 39 and extending between the free ends of the arms 38 is an axle shaft 40. One end of this axle shaft projects through and beyond the adjacent arm 38 and is fitted with a knob 41 by which the shaft may be rotated. Carried on opposite ends of the shaft 40 are heads 42 which are circular in form and supported on the peripheries of the heads 42 is a tubular body 43 forming the copy holding cylinder of the device. Each head 42 is provided with an outstanding flange which projects beyond the periphery of the tubular body 43, and each of these flanges is provided with an annular flange 44 which cooperates with the tubular body 43 in forming an annular groove 45 in which a copy retaining bar 46 is mounted for adjustment.

As illustrated the channels 45 extend substantially entirely around the tubular body or drum 43 adjacent opposite ends and provided adjacent the termini of the channels 45 at one end of the cylinder are spaced eyes 47 and 48. A radially extending lip 49 projects outwardly from the head at the end of the drum opposite the eyes 47 and 48 and this lip is provided with spaced L-shaped slots 50 and 51 forming hooks 52 and 53 respectively. Hingedly connected as by a loop 54 to the eye 47 is a clamp bar 55 which when in clamping position extends parallel with the axis of the shaft 40 over the periphery of the tubular body 43 and is engaged in the slot 50. An upwardly extending hook 56 is formed on the end of the rod 55 opposite the loop 54 for engagement over the outer face of the hook 52 as will be readily understood upon reference to Figure 6. A similar clamp bar 57 is connected as by a loop 58 to the eye 48 and is adapted to lie parallel with the clamp bar 55 and be entered into the L-shaped slot 51. Like the clamp bar 55, the clamp bar 57 is provided with an outturned hook 58' which overlies the outer face of the hook 53 when the bar 57 is in copy clamping position.

In use the copy holder is set behind a typewriter as suggested in Figures 1 and 2 with the foot 27' lying immediately beneath the rear end of the typewriter. In this position the members 29 of the standards 19 may be adjusted so that when the copy carrying roller is swung into the position shown in Figure 2, in full lines, it will lie above and slightly to the rear of the platen of the typewriter. The matter to be copied is then placed around the cylinder or tubular body 43 and clamped in position as suggested in Figure 6 by means of the clamp bars 55 and 57. Should the matter to be copied be on a short page it is obvious that one end may be placed under either the bar 55 or 57 and the opposite end under the bar 46 which may be moved circumferentially around the cylinder or drum 43 in the grooves 45. The copy may be advanced by rotating the knob 41 which will cause the cylinder to rotate about the axis of the shaft 40 and when it is necessary to replenish the paper in the typewriter it is only necessary to throw the cylinder or drum 43 back into the dotted line position illustrated in Figures 2 and 4. When in this position the entire top of the typewriter is clear and when it is desired again to resume copying the material supported on the cylinder or drum 43 it is only necessary again to swing the arms about the axis of the rod 37 until they rest on the stops 33 on the upper ends of the standards. When in this position the copy matter on the drum will be in the line of vision of the person using the typewriter so that only a slight shifting of the eyes is necessary in order to follow the copy matter and check the copy that is being made on the platen of the typewriter.

While in the foregoing there has been shown and described the preferred embodiment of this invention it is to be understood that minor changes in the details of construction, combination and arrangement of parts may be resorted to without departing from the spirit and scope of the invention as claimed.

I claim:

In a copy holder a cylinder mounted to rotate above and slightly to the rear of a typewriter platen, a copy clamping bar detachably connected to the cylinder adjacent opposite ends thereof, a flange carried by each end of the cylinder in spaced relation to the periphery thereof, said flanges lying in overhanging relation to the cylinder and a peripherally adjustable copy clamping bar disposed longitudinally against the periphery of the cylinder with opposite ends frictionally held by the flanges against the cylinder.

JOSEPH SINDELAR.

REFERENCES CITED

The following references are of record in the file of this patent:

UNITED STATES PATENTS

| Number | Name | Date |
| --- | --- | --- |
| 808,821 | Dudley | Jan. 2, 1906 |
| 1,544,401 | Homan | June 30, 1925 |
| 2,006,714 | Kunc | July 2, 1935 |

FOREIGN PATENTS

| Number | Country | Date |
| --- | --- | --- |
| 67,574 | Norway | Nov. 18, 1942 |
| 196,675 | Switzerland | Mar. 31, 1938 |
| 680,665 | Germany | Sept. 2, 1939 |